PECARE & SMITH.
Revolver.
No. 172.
Reissued Aug. 13, 1850
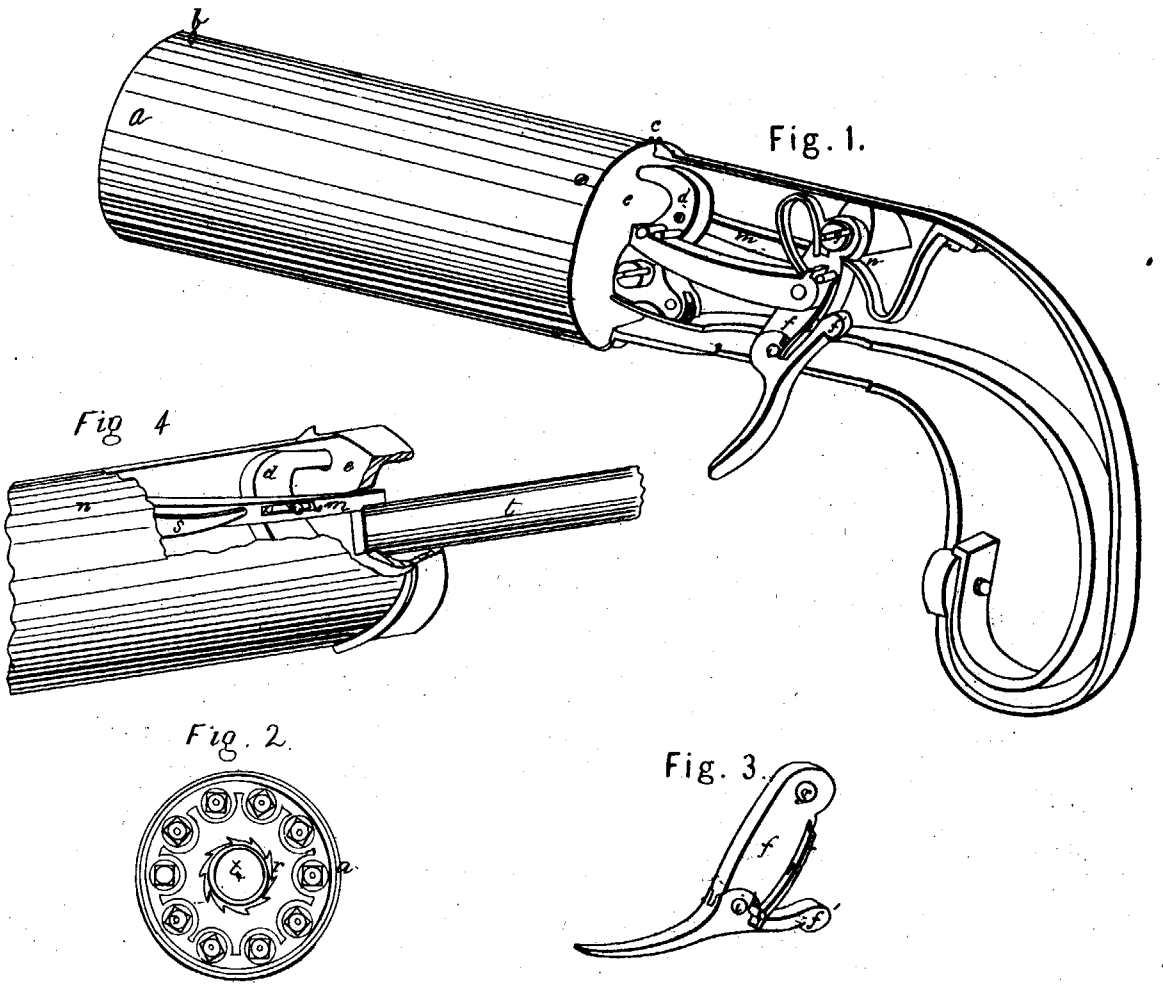
N. PETERS, PHOTO-LITHOGRAPHER, WASHINGTON, D. C.

UNITED STATES PATENT OFFICE.

J. PECARE AND J. M. SMITH, OF NEW YORK, N. Y.

FIRE-ARMS.

Specification forming part of Letters Patent No. 6,925, dated December 4, 1849; Reissue No. 172, dated August 13, 1850.

*To all whom it may concern:*

Be it known that we, JACOB PECARE and JOSIAH M. SMITH, both of the city, county, and State of New York, have invented a new and useful Improvement in the Triggers for Revolving Pistols; and we do hereby declare the following to be a full, clear, and exact description of the same, reference being had to the annexed drawings, making a part of this specification, in which like letters refer to like parts in all the figures.

The nature of our invention consists in so constructing a repeating or revolving pistol that the concealment of the trigger, hitherto unattained in revolvers, but particularly desirable in that kind of pistol, is effected, thus securing in an unusual degree efficiency of action, security from accidental discharge, and portability.

The construction is as follows: The barrels, of which we prefer to make ten, are of the usual form in such pistols, but have a sheath or tube of metal, *a*, surrounding them throughout their entire length. This is secured firmly by screws, or otherwise, to the stock in such manner that the barrels may revolve freely within the sheath; and it is for the purpose of preventing the revolution of the barrels from being interrupted by the grasp of the assailed party. It also affords a position for a fixed bead, and thus enables a sure aim to be taken. On the farther end of the sheath a bead, *b*, is placed, and on the stock a sight, *c*. The hammer *d* is placed vertically within the stock, and strikes through the plate *e* upon the nipple of the uppermost barrel. It is drawn back in the act of revolving the barrels and of firing by a trigger, *f*, which is a lever of the second class, having its fulcrum at *g* and a connecting-rod at *h*. The trigger has a joint at the point *i*, where it extends beyond the stock, that the lower or external part when not in use may be folded, so as to lie in a line parallel to the axis of the barrel. At this point a common device, consisting of a pin, *k*, and spring *k'*, pressing against it, retains the external end of the trigger either in an extended or folded position. An arm, *f'*, on the external portion of the trigger will, when pressed, open out this part and complete the trigger for action. The barrels are made to revolve by the action of the lever of the third class, *m*, having its fulcrum at *n*. A pin, *o*, projecting from the side of the hammer imparts the required motion to this lever by depressing it while the hammer is being drawn back by the trigger. This pin works through a slot, *p*, in the lever *m*, and thus raises it again when the hammer strikes. The end of the lever *m* engages the ratch *r* on the barrels, and as it is depressed it moves the barrels around on the shaft *t* and within the sheath *a*. When the hammer is striking and the lever is being raised the end passes up outside the ratch and drops into the notch above that it has just left. The end of the lever *m* is kept pressing sidewise against the ratch by a spring, *s*. From the upper end of the trigger an arm extends through the plate into holes in the barrels, for the purpose of preventing the barrels from revolving too far at each fire, which might occur by reason of the momentum when firing rapidly. This device is similar to that already in use for the same purpose, and is not represented in the drawings, as it would render them obscure in more important parts.

We do not intend to confine ourselves to the precise forms of construction above indicated, but desire to vary the same when expedient, while we produce the same results by equivalent mechanical means.

What we claim as of our own invention, and which we desire to secure by Letters Patent, is—

The construction of a concealed trigger capable of being disclosed and made ready to operate by simple pressure imparted by the hand to its rear end, as described herein.

JACOB PECARE.
JOSIAH M. SMITH.

Witnesses:
S. H. MAYNARD,
THOMAS H. WOOD.